(12) United States Patent
Mittler et al.

(10) Patent No.: US 12,486,897 B2
(45) Date of Patent: Dec. 2, 2025

(54) OIL SCRAPER RING FOR PISTONS OF AN INTERNAL COMBUSTION ENGINE

(71) Applicant: FEDERAL-MOGUL BURSCHEID GMBH, Burscheid (DE)

(72) Inventors: Richard Mittler, Burscheid (DE); Fabian Ruch, Leverkusen (DE)

(73) Assignee: FEDERAL-MOGUL BURSCHEID GMBH, Burscheid (DE)

( * ) Notice: Subject to any disclaimer, the term of this patent is extended or adjusted under 35 U.S.C. 154(b) by 177 days.

(21) Appl. No.: 18/007,118

(22) PCT Filed: May 31, 2021

(86) PCT No.: PCT/EP2021/064540
§ 371 (c)(1),
(2) Date: Jan. 27, 2023

(87) PCT Pub. No.: WO2022/022875
PCT Pub. Date: Feb. 3, 2022

(65) Prior Publication Data
US 2023/0228329 A1     Jul. 20, 2023

(30) Foreign Application Priority Data

Jul. 28, 2020   (DE) .......................... 102020119789.6

(51) Int. Cl.
*F16J 9/06*   (2006.01)
*F16J 9/20*   (2006.01)

(52) U.S. Cl.
CPC ................... *F16J 9/206* (2013.01); *F16J 9/06* (2013.01)

(58) Field of Classification Search
CPC ................... F16J 9/206; F16J 9/06
See application file for complete search history.

(56) References Cited

U.S. PATENT DOCUMENTS 384,272 A * 6/1888 Patten ................ F16J 9/20
277/495
1,522,341 A * 1/1925 Sutton ................ F16J 9/206
277/463

(Continued)

FOREIGN PATENT DOCUMENTS

| DE | 1242957 B | 6/1967 |
| DE | 2000923 A1 | 7/1971 |
| GB | 2307956 A | 6/1997 |

*Primary Examiner* — Vishal A Patel
(74) *Attorney, Agent, or Firm* — Dickinson Wright PLLC—Troy

(57) ABSTRACT

An oil scraper ring is provided for pistons (2) of an internal combustion engine having an oil scraper piston ring groove (4) formed without at least one oil drain bore. The scraper ring includes a ring body (6) comprising an upper ring flank (8), a lower ring flank (10), a ring inner side (12), a ring outer side (14) and two abutting surfaces (16, 18). An upper oil scraper rail (20) and a lower oil scraper rail (22) extend in the circumferential direction in spaced apart relation from one another in the axial direction and extend radially to the outside from the ring outer side (14) are arranged on the ring outer side (14). Oil passages (24) running in the radial direction are arranged in a region between the upper scraper rail (20) and the lower scraper rail (22), and at least one groove (26) extends in the radial direction on the lower ring flank (10).

3 Claims, 6 Drawing Sheets

(56) References Cited

U.S. PATENT DOCUMENTS

Figure 1:
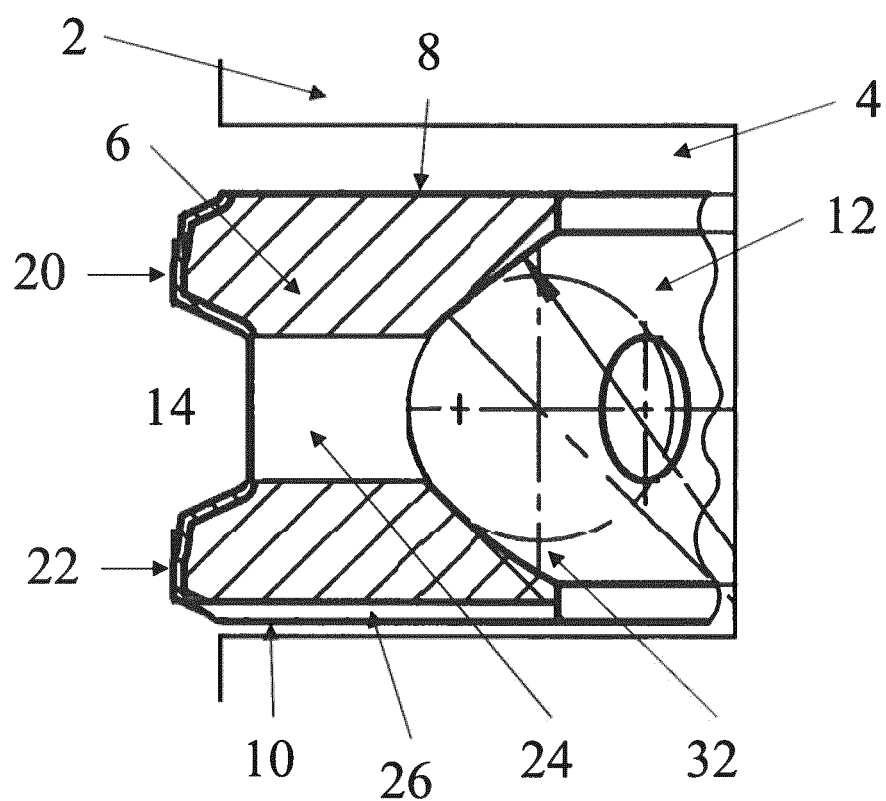

| | | | | | |
|---|---|---|---|---|---|
| 1,558,515 | A | * | 10/1925 | Teetor | F16J 9/206 277/463 |
| 1,579,043 | A | * | 3/1926 | Wester | F16J 9/203 277/463 |
| 1,771,198 | A | * | 7/1930 | Walter | F16J 9/20 277/463 |
| 2,112,103 | A | * | 3/1938 | Kottusch | F16J 9/203 277/924 |
| 2,372,979 | A | * | 4/1945 | Phillips | F16J 9/206 29/888.07 |
| 3,195,903 | A | * | 7/1965 | Hesling | F16J 9/203 277/444 |
| 4,522,412 | A | * | 6/1985 | Kubo | F16J 9/26 277/476 |
| 4,835,856 | A | * | 6/1989 | Azami | F16J 15/3228 72/352 |
| 5,133,563 | A | * | 7/1992 | Casellato | F16J 9/02 277/436 |
| 5,169,162 | A | * | 12/1992 | Azaml | F04B 39/042 92/158 |
| 5,241,748 | A | * | 9/1993 | Ishida | C23C 8/38 29/888.074 |
| 5,295,696 | A | * | 3/1994 | Harayama | F16J 9/062 277/464 |
| 5,651,553 | A | * | 7/1997 | Ishida | F16J 9/062 277/463 |
| 6,189,896 | B1 | * | 2/2001 | Dickey | F16C 17/045 277/400 |
| 6,821,408 | B2 | * | 11/2004 | Sasaki | C25D 11/005 205/148 |
| 7,523,944 | B2 | * | 4/2009 | Hatori | F16J 15/441 277/460 |
| 2018/0363484 | A1 | * | 12/2018 | Miller | F16J 15/16 |

* cited by examiner

OIL SCRAPER RING FOR PISTONS OF AN INTERNAL COMBUSTION ENGINE

BACKGROUND

1. Technical Field

The present invention relates to an oil scraper ring for pistons of an internal combustion engine, in particular pistons without oil drain bores.

2. Related Art

Oil scraper rings are designed to distribute oil on a cylinder wall in the circumferential direction and to scrape excess oil off the cylinder wall. To improve the sealing and scraping function, oil scraper rings are usually provided with two scraper rails. Each of these rails scrapes excess oil off the cylinder wall. A certain quantity of oil, which has to be discharged from the ring region, thus accumulates on the lower edge of the oil scraper ring as well as between the rails. In particular during the power stroke of a two-stroke engine or during the intake stroke and power stroke of a four-stroke engine, respectively, oil originating from the crankcase, which is scraped off an upper scraper rail and accumulates between the rails, has to be discharged from this region because it otherwise possibly reaches over the oil scraper ring and then has to be scraped off the second sealing ring. One- and two-piece oil scraper rings are usually provided with longitudinal slits or bores, which run between the ring rails in the radial direction, so that excess oil, which is located between the scraper rails, can drain inwards. The oil scraped off the upper rail during a downwards movement of a piston is guided into the ring base through these openings in the ring body to the rear side of the ring. From there, the scraped-off oil can be discharged in different ways. The oil is usually guided via bores in the oil scraper groove to a piston inner side, so that it can drip back from there into the oil pan. It is also possible to return oil scraped off by means so-called cover slots via recesses in the region of the piston bolt on the piston outer side. However, a combination of both embodiments is used as well.

Pistons for reciprocating piston engines are mainly made of aluminum alloys but also cast iron and steel. Blanks of aluminum pistons are thereby cast or forged in molds. Jacket surface, valve pockets, piston ring grooves, and the piston bolt bore are subsequently machined mechanically.

This is countered by pistons made of steel. They expand only approximately half as much as its aluminum predecessor, which is why the play of the steel piston in the aluminum housing can be smaller, and a friction, which is reduced by 40 to 50 percent, results therefrom. The thermodynamic efficiency furthermore improves because the lower heat conductivity of steel causes increased component temperatures, which is associated with higher ignition performance and reduced combustion time.

Steel pistons, however, have a large disadvantage because the manufacture of the ducts for a drainage of the oil in the oil scraper groove is very cost intensive. The trend among steel pistons is thus towards no longer providing any drain ducts, which often results in an oil consumption problem.

An oil scraper ring is already known from DE 1 242 957 for reciprocating pistons comprising a pair of rails, which are held at a distance and which extend radially outwards and thereby contact the cylinder wall as the only parts under spring pressure, wherein an oil collecting groove is formed between the rails. On its lower side facing away from the piston head, the ring thereby has intermediate pieces, which are distributed over the circumference and which are held at a distance, which are dimensioned in the radial direction so that an oil collecting chamber is formed below the rail, which communicates with the piston inner space via passages and openings, and the oil collecting groove does not have any connection to the piston inner space between the rails forming said oil connecting groove.

SUMMARY OF THE INVENTION

It is the object of the invention to form an oil scraper ring so that the latter has an optimized oil scraping effect for pistons without oil drain bores and a weakening or a tearing, respectively, of the oil film is thus prevented.

According to a first aspect, an oil scraper ring for pistons of an internal combustion engine is provided, wherein an oil scraper piston ring groove of the piston is arranged without at least one oil drain bore. The oil scraper ring comprises a ring body comprising an upper ring flank, a lower ring flank, a ring inner side, a ring outer side, as well as two abutting surfaces. An upper oil scraper rail and a lower oil scraper rail, which extend in the circumferential direction spaced apart from one another in the axial direction and which extend radially to the outside from the ring outer side, are arranged on ring outer side. Oil passages running in the radial direction are furthermore arranged in a region between the upper scraper rail and the lower scraper rail. At least one groove running in the radial direction is moreover formed on the lower ring flank.

The advantage of such an scraper ring is that scraped off oil from the oil collecting groove can flow off through the oil passages behind the ring and from there through the at least one groove on the lower ring flank into the gap between piston and cylinder. It is not necessary thereby that any oil drain bores have to be provided in the oil scraper ring groove of the piston. Due to the fact that in this embodiment the oil is transported only underneath the piston rings, it can be ensured that the oil film between piston and cylinder is not weakened and does not tear. Due to the larger quantity of oil underneath the piston rings, an insufficient lubrication can be counteracted.

In an exemplary embodiment of the oil scraper ring, the at least one groove has a constant depth and/or a constant width. The manufacture of such geometries is cost efficient . . . a groove geometry of this type provides for a constant drainage of the scraped off oil.

In another exemplary embodiment of the oil scraper ring, the at least one groove has a depth or a width, which decreases from the inside to the outside in the radial direction. The advantage of such a groove geometry is that the oil flow-off can be controlled more easily because only the smallest cross sectional surface of the groove determines a flow-through quantity. It can moreover be attained by means of this geometry that the oil flow is reduced from the outside to the inside in the radial direction and an insufficient lubrication is thus prevented.

In a further embodiment of the oil scraper ring, the at least one groove has a semi-circular cross section. A semi-circular cross section can be bored in a technically advantageous manner and moreover represents an oil flow-off geometry without interfering influences.

In a further embodiment of the oil scraper ring, a groove base of the at least one groove is formed in a semi-circular manner, and a groove flank is aligned parallel to an oppositely located groove flank. A semi-circular cross section of the groove base can be bored in a technically advantageous manner and additionally represents an oil flow-off surface without interfering influences, whereby the following parallel groove flanks increase an oil flow-off volume.

In a further exemplary embodiment of the oil scraper ring, several grooves are provided, which are arranged at even angular distances in the circumferential direction on the lower ring flank. A constant oil flow-off is thus ensured in order to prevent insufficient lubrication on the entire running surface. The even angular distance thereby refers to two grooves located next to one another in the circumferential direction. It is furthermore preferred to regard the ring gap like one of the grooves.

In an embodiment of the piston ring, each groove are is arranged at an angular distance of 360/(n+1°) from another one of the at least one groove, in the case of a number of n>1 grooves, and wherein grooves, which are located closest to an oil scraper ring gap, likewise have an angular distance of 360/(n+1°) from said oil scraper ring gap in an oil scraper ring plane or oil scraper ring projection, respectively, based on a center point (30) of the oil scraper ring. These specifications can have a deviation of up to +−3°. Due to this arrangement of the grooves, a constant oil flow-off is ensured in order to prevent insufficient lubrication on the entire circumference of the entire running surface. A manufacture of the symmetrically arranged grooves can be realized in an advantageous manner.

In another exemplary embodiment of the oil scraper ring, six grooves are arranged on the oil scraper ring, wherein they are arranged at an angular distance of 14.5° to 30.5°, 104.5° to 120.5°, 149.5° to 165.5°, 194.5° to 210.5°, 239.5° to 255.5°, 329.5° to 345.5°, preferably 17.5° to 27.5°, 107.5° to 117.5°, 152.5° to 162.5°, 197.5° to 207.5°, 242.5° to 252.5°, 332.5° to 342.5°, particularly preferably 20.5° to 24.5°, 110.5° to 114.5°, 155.5° to 159.5°, 200.5° to 204.5°, 245.5° to 249.5°, 335.5° to 339.5° from the abutting surface (16) or from the abutting surface (18) in an oil scraper ring plane or oil scraper ring projection, respectively, based on the center point (30). A number of six grooves is advantageous because this number ensures an optimal oil flow-off and insufficient lubrication on the entire running surface is thus prevented. The symmetry of the groove positions is technically cost optimized.

In a further embodiment of the oil scraper ring, the latter is provided on the ring inner side with a groove, which runs in the circumferential direction, and into which an expander spring, preferably a tubular spring, is inserted. Compared to the one-piece oil scraper ring, this two-piece oil scraper ring has a significantly reduced cross sectional surface. The ring body is thus relatively flexible and has a very good mold filling ability. The groove on the ring inner side forms a spring bed of the tubular spring, and the cross section thereof is formed either in a semi-circular or v-shaped manner. The force, with which the scraper rails of the oil scraper ring are pressed against a cylinder inner side, originates from an expander spring, preferably a tubular spring, made of heat resistant spring steel. During operation, the spring abuts firmly on the rear side of the ring body and, together with the latter, forms a unit. Even though the spring does not rotate against the ring, the entire oil scraper ring—as well as other rings-rotate in the piston ring groove in the circumferential direction during operation. In the case of two-piece oil scraper rings, the radial pressure distribution is always symmetrical because the contact pressure is evenly large over the entire coil spring circumference.

According to a further aspect, the invention relates to a piston comprising at least one oil scraper piston ring groove, wherein the piston does not have an oil drain opening from the oil scraper piston ring groove in the direction of a crankcase, wherein an oil scraper ring in the oil scraper piston ring groove, wherein the piston is made of steel or aluminum.

It is provided to provide aluminum pistons or steel pistons without oil drain openings. In the case of steel pistons, it is particularly cost intensive to provide oil drain openings. However, the advantage of steel piston is that the latter expands only half as much as an aluminum piston, which is why the play of the steel piston in the aluminum housing can be smaller. This effects a greater effective play of the piston in the cylinder and reduced friction.

Due to higher strength of the steel piston, friction advantages are furthermore attained during engine operation, and the thermodynamic efficiency improves, whereby an internal combustion engine can operate at higher temperatures. The overall height of steel pistons can be smaller than in the case of aluminum pistons, whereby the entire engine can be designed with a smaller overall height. A smaller overall height and thus a flatter engine block thereby provides for a lower weight and/or higher ignition pressures compared to a conventional design. Due to the use of the above-described oil scraper ring, an oil scraper piston ring groove without oil drain openings from the oil scraper piston ring groove in the direction of a crankcase can be used.

According to a further aspect, the invention relates to an internal combustion engine comprising at least one piston, which is provided with one of the above-described oil scraper rings.

According to a further aspect, the invention relates to an internal combustion engine, wherein the piston is made or consists, respectively, of steel or aluminum.

The usability of the scraper ring in piston ring grooves, which do not have any oil drains, represents a limitation with respect to the prior art. In addition to oil passages, the oil scraper ring has grooves, which run in the radial direction and which, in geometric combination, ensure an optimal oil scraping behavior. This systematic oil flow from a ring inner side in the direction of the crankcase as well as in the opposite direction ensures that the oil film does not tear off or becomes too thin. The ratio of bearing surface of the lower ring flank to the opening surface of the grooves is furthermore more favorable due to the higher mechanical forces and temperatures, which act when using pistons without oil drain openings, in particular in the case of steel pistons without oil drain openings because a relatively small bearing surface promotes a piston seizure.

THE DRAWINGS

Figure 2:
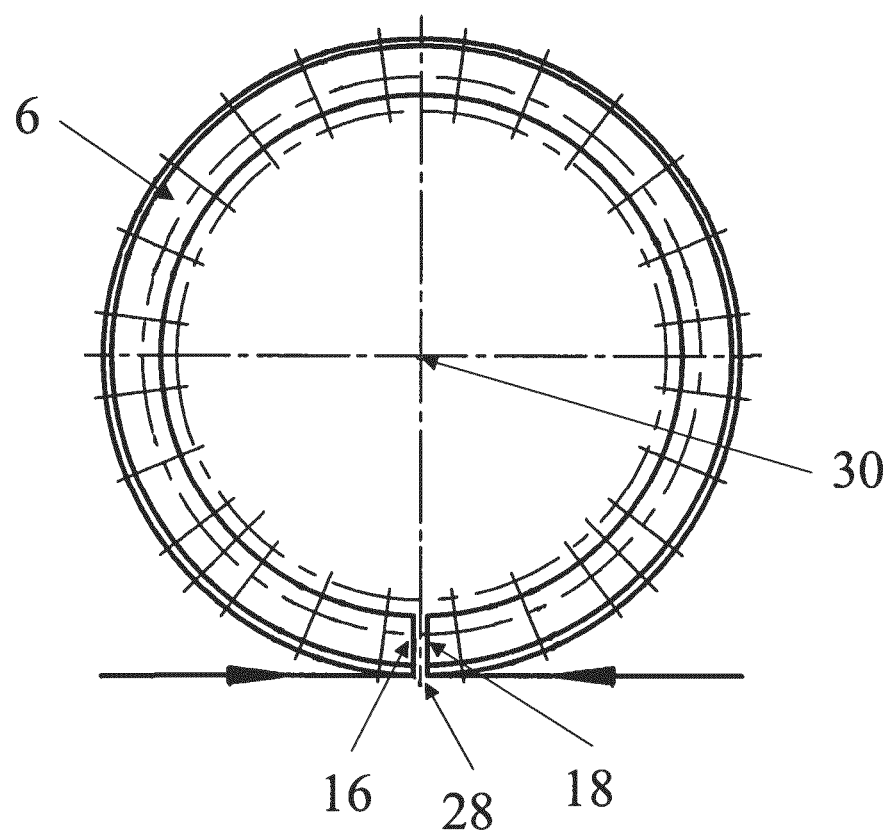
Figure 3:
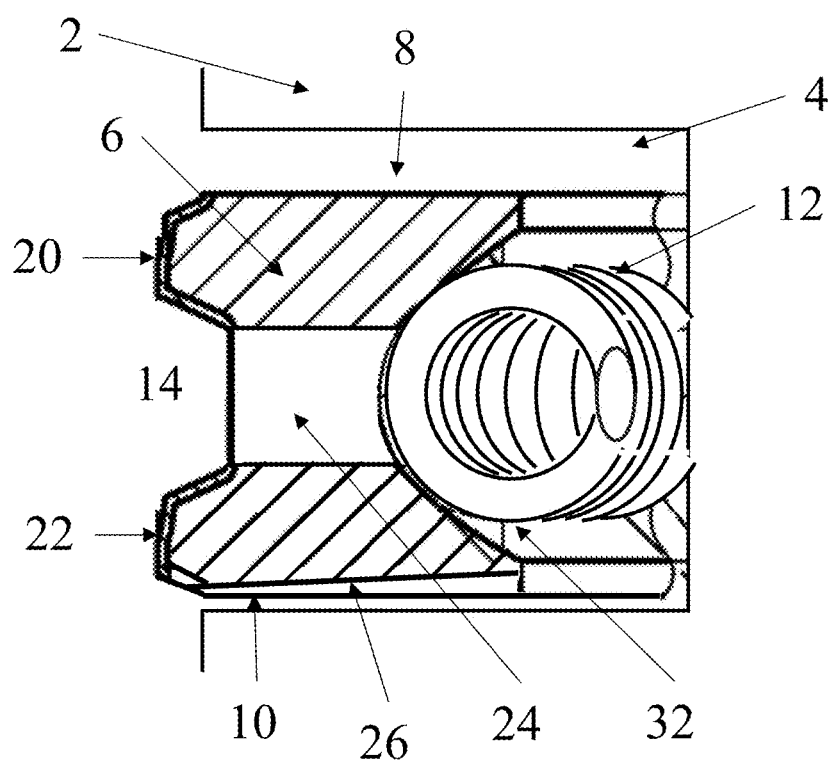
Figure 4:
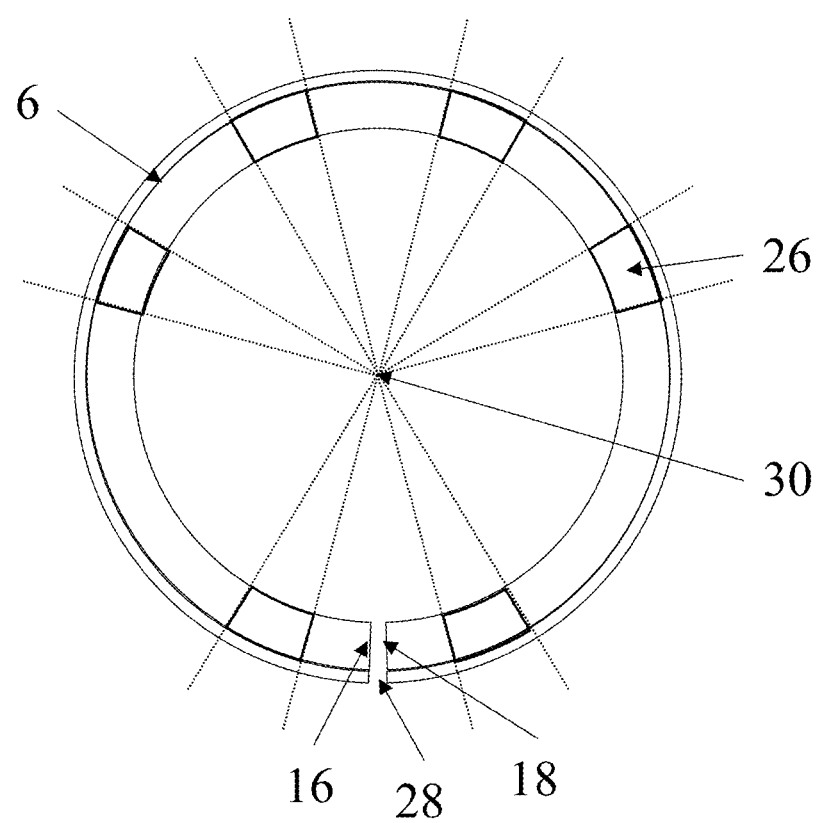
Figure 5:
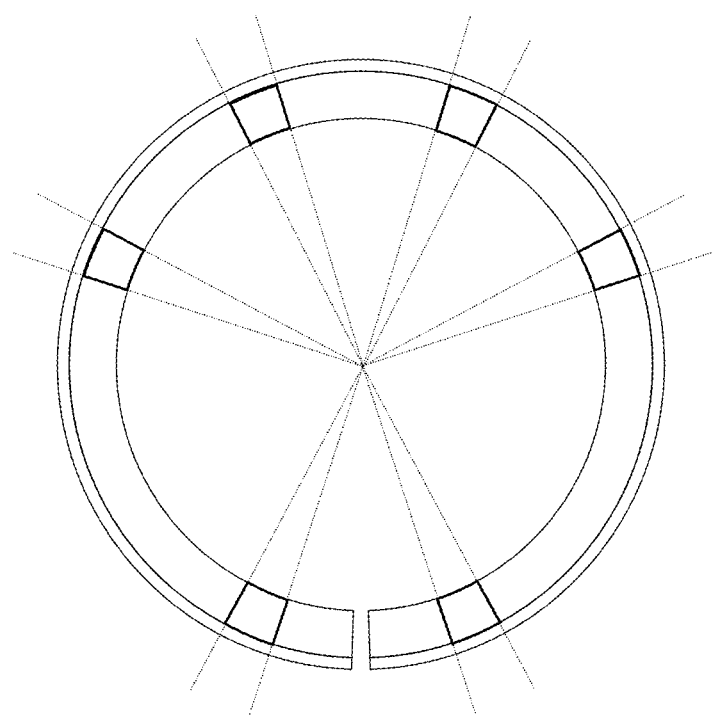
Figure 6:
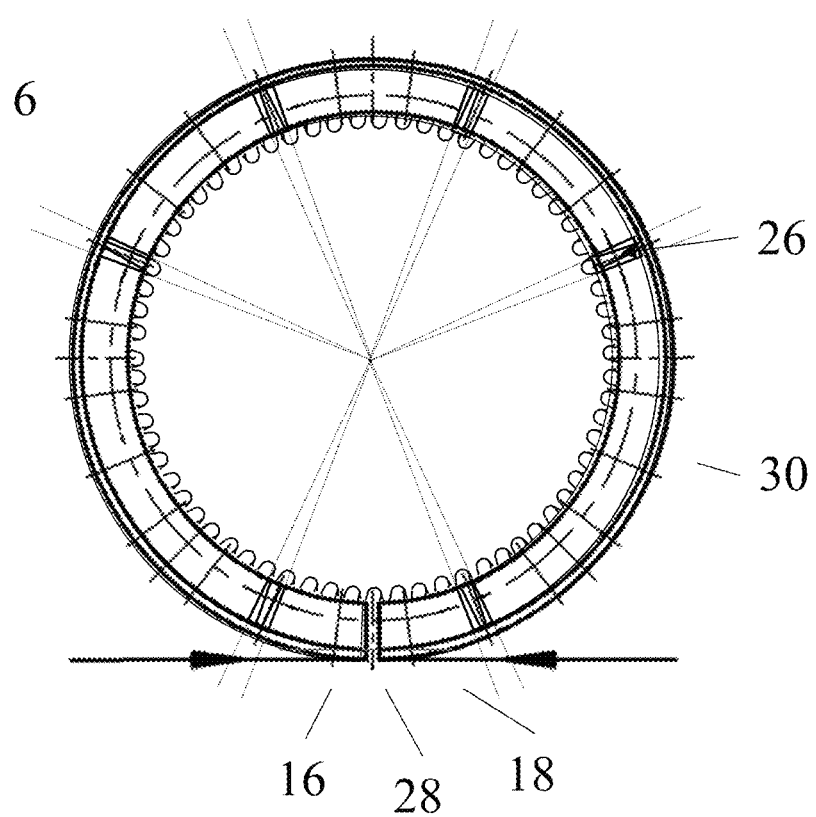

Exemplary embodiments of the invention will be described in more detail below with reference to the figures based on schematic illustrations, wherein FIG. 1 shows an oil scraper ring according to an embodiment of the invention, and FIG. 2 shows an arrangement of the grooves on the oil scraper ring.

DETAILED DESCRIPTION

FIG. 1 shows a cross sectional view of an oil scraper ring, which is installed in an oil scraper piston ring groove 4 of a piston 2 without oil drain means or oil drain bores. The oil scraper ring has an upper ring flank 8, a lower ring flank 10, a ring inner side 12, and a ring outer side 14. The upper ring flank 8 is arranged on the combustion chamber side and the lower ring flank on the crankcase side. Two spaced-apart oil scraper rails are arranged on the ring outer side 14. The upper oil scraper rail 20 is arranged on the combustion chamber side and the lower oil scraper rail 22 on the crankcase side. The two oil scraper rails 20, 22 scrape oil off a non-illustrated cylinder inner wall, which forms the running surface for the piston.

Two types of oil passages are arranged in the ring body 6. Oil passages 24, which are arranged between the two oil scraper rails 20, 22 and which run to the ring inner side in the radial direction, on the one hand. Oil accumulating between the two oil scraper rails 20, 22 can drain to the ring inner side 12 through the oil passages 24. Grooves 26, which are arranged on the lower ring flank 10 and through which the oil can flow from the ring inner side 12 to the ring outer side 14 as well as from the ring outer side 14 to the ring inner side 12, on the other hand. The oil passages 24 as well as the grooves 26 run in a radial direction ring body 6. An axial direction corresponds to the longitudinal axis of the piston 2 or to the direction of movement thereof, respectively, and runs perpendicular to the radial direction.

The grooves (26) are arranged at even angular distances in the circumferential direction on the lower ring flank. A constant oil flow-off is thus ensured in order to prevent insufficient lubrication on the entire running surface. In a further exemplary embodiment of the oil scraper ring, several grooves (26) are provided, which are arranged at even angular distances in the circumferential direction on the lower ring flank. A constant oil flow-off is thus ensured in order to prevent insufficient lubrication on the entire running surface. The even angular distance thereby refers to two grooves (26) located next to one another in the circumferential direction. It is furthermore preferred to regard the ring gap like one of the grooves (26).

In an embodiment of the piston ring, each groove (26) is arranged at an angular distance of 360/(n+1°) from another one of the at least one groove (26), in the case of a number of n>1 grooves (26), and wherein grooves (26), which are located closest to an oil scraper ring gap, likewise have an angular distance of 360/(n+1°) from said oil scraper ring gap in an oil scraper ring plane or oil scraper ring projection, respectively, based on a center point (30) of the oil scraper ring. These specifications can have a deviation of up to +−3°. Due to this arrangement of the grooves (26), a constant oil flow-off is ensured in order to prevent insufficient lubrication on the entire circumference of the entire running surface. A manufacture of the symmetrically arranged grooves (26) can be realized in an advantageous manner.

In another exemplary embodiment of the oil scraper ring, six grooves (26) are arranged on the oil scraper ring, wherein they are arranged at an angular distance of 14.5° to 30.5°, 104.5° to 120.5°, 149.5° to 165.5°, 194.5° to 210.5°, 239.5° to 255.5°, 329.5° to 345.5°, preferably 17.5° to 27.5°, 107.5° to 117.5°, 152.5° to 162.5°, 197.5° to 207.5°, 242.5° to 252.5°, 332.5° to 342.5°, particularly preferably 20.5° to 24.5°, 110.5° to 114.5°, 155.5° to 159.5°, 200.5° to 204.5°, 245.5° to 249.5°, 335.5° to 339.5° from the abutting surface (16) or from the abutting surface (18) in an oil scraper ring plane or oil scraper ring projection, respectively, based on the center point (30). A number of six grooves (26) is advantageous because this number ensures an optimal oil flow-off and insufficient lubrication on the entire running surface is thus prevented. The symmetry of the groove (26) positions is technically cost optimized.

A groove 32 running in the circumferential direction, in which an expander spring 34, preferably a tubular spring, runs, can further be seen in FIG. 1. The expander spring is suggested as circle. Compared to the one-piece oil scraper ring, a two-piece oil scraper ring comprising an expander spring has a significantly smaller cross sectional surface. The ring body 6 is thus relatively flexible and, in combination with the expander spring, displays a very good mold filling ability. The oil scraper ring is pressed predominantly by the expander spring against the cylinder wall. The expander spring is made of heat resistant spring steel. In the case of two-piece oil scraper rings, the radial pressure distribution is always virtually symmetrical because the contact pressure is evenly large over the entire coil spring circumference. To increase the service life, the outer diameters expander spring are ground, are wound more tightly on the abutting surfaces 16, 18, or are also covered with a Teflon tubing. Due to these measures, the bearing surface is enlarged, the surface loading is reduced, and the friction wear between ring body 6 and expander spring is thus reduced. The ring body 6 is either made of aluminum, grey cast iron, or steel.

FIG. 2 shows a top view in the axial direction of the ring body 6, wherein abutting surfaces 16, 18, an oil scraper ring gap 28, and a center point of the oil scraper ring 30 can be seen.

What is claimed is:

1. An oil scraper piston ring of an internal combustion engine, comprising:
    a ring body comprising
    an upper ring flank,
    a lower ring flank,
    a ring inner side,
    a ring outer side, and two abutting surfaces;
    wherein the ring outer side includes an upper oil scraper rail and a lower oil scraper rail extending in a circumferential direction being spaced apart from one another in an axial direction and projecting radially outward from the ring outer side;
    wherein the ring body includes at least one oil passage extending in a radial direction from the ring inner side to the ring outer side in a region between the upper oil scraper rail and the lower oil scraper rail,
    wherein the lower ring flank includes at least one oil groove extending in the radial direction that has a depth which decreases from an inside to an outside of the ring body in the radial direction, and wherein the ring inner side includes a spring groove which runs in the circumferential direction for receipt of an expander spring;
    wherein the at least one oil groove comprises a plurality of oil grooves arranged at even angular distances in the circumferential direction on the lower ring flank;
    wherein the plurality of oil grooves includes six oil grooves arranged on the oil scraper ring at angular distances of 14.5° to 30.5°, 104.5° to 120.5°, 149.5° to 165.5°, 194.5° to 210.5°, 239.5° to 255.5°, and 329.5° to 345.5° from one of the abutting surfaces in an oil scraper ring plane or from the other one of the abutting surfaces in an oil scraper ring projection, respectively, based on a center point of the oil scraper ring; and
    wherein the plurality of oil grooves on the lower flank includes no more than the six oil grooves.

2. The oil scraper ring according to claim 1, wherein the angular distances are 17.5° to 27.5°, 107.5° to 117.5°, 152.5° to 162.5°, 197.5° to 207.5°, 242.5° to 252.5°, and 332.5° to 342.5°.

3. The oil scraper ring according to claim 1, wherein the angular distances are 20.5° to 24.5°, 110.5° to 114.5°, 155.5° to 159.5°, 200.5° to 204.5°, 245.5° to 249.5°, and 335.5° to 339.5°.

* * * * *